United States Patent
Moy

(10) Patent No.: US 7,057,141 B1
(45) Date of Patent: Jun. 6, 2006

(54) TEMPERATURE CONTROL METHOD AND APPARATUS

(75) Inventor: Siu Teong Moy, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/168,250

(22) Filed: Jun. 28, 2005

(51) Int. Cl.
*H05B 1/02* (2006.01)

(52) U.S. Cl. ........................ 219/497; 219/216; 219/469; 355/405; 399/69

(58) Field of Classification Search .............. 219/216, 219/494, 497, 499, 501, 506, 486, 469, 665; 355/401, 405; 399/335, 69, 70
See application file for complete search history.

(56) References Cited

U.S. PATENT DOCUMENTS 6,359,269 B1 * 3/2002 Hayasaki et al. .......... 219/665
2004/0057746 A1 * 3/2004 York ........................ 399/94
2004/0060921 A1   4/2004 Justice et al.
2004/0108309 A1   6/2004 Dempsey
2005/0103770 A1   5/2005 Lee

* cited by examiner

Primary Examiner—Mark Paschall
(74) Attorney, Agent, or Firm—Fay, Sharpe, Fagan, Minnich & McKee, LLP

(57) ABSTRACT

A thermal mass is characterized by a reference temperature. A thermal interrupter thermally interrupts the thermal mass upon contact. A look ahead processor examines the thermal interrupter ahead of anticipated contact with the thermal mass and determines an amount of anticipated thermal interruption. A PID gain calculator determines a PID gain for a control algorithm based on the determined amount of thermal interruption. A heater processor applies the control algorithm to a heater to heat the thermal mass to a prespecified start temperature which exceeds the reference temperature.

20 Claims, 4 Drawing Sheets

TEMPERATURE CONTROL METHOD AND APPARATUS

BACKGROUND

The present exemplary embodiment relates to thermal systems. It finds particular application in conjunction with a thermal control of the printer fuser and will be described with a particular reference thereto. However, it is to be appreciated that the present exemplary embodiment is also amenable to other thermal control systems and like applications.

In a typical xerographic marking engine, such as a copier or printer, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper. The fusing of the toner onto the paper is generally accomplished by applying heat to the toner with a heated roller and application of pressure to fuse and permanently affix the powder image to the copy sheet.

In order to fuse and fix the powder toner particles onto a copy sheet or support member permanently as above, it is necessary for the thermal fusing apparatus to elevate the temperature of the toner images to a point at which constituents of the toner particles coalesce and become tacky.

Typically, when started up, each reproduction machine goes through a warm up phase during which the heated member of the fusing apparatus gradually warms up to where the fusing channel or fusing nip reaches and can be maintained at the high fusing temperature. After that, the machine can be activated to run a job reproducing images through a run or operating cycle. After one of such jobs, the machine may be idle or go into an idle or a standby mode, while waiting for the next reproduction job.

The fuser roll is a large thermal mass whose temperature must be controlled to tight tolerances for a good quality print job. When the print media enters the system, the fuser roll surface temperature begins to drop. Typically, the current PID temperature controller runs a standard temperature control algorithm which lacks speed and gain to bring the fuser roll surface temperature back to steady state in a short period of time. As a result, during the beginning of a large print job, the fuser roll surface temperature substantially drops. Once the temperature of a fusing apparatus starts to drop or fall, the fuser roll acquires a thermal inertia which makes reversal or recovery difficult. As the standard temperature control algorithm brings temperature back up to the fusing temperature, it causes an overshoot by the end of the job. The problem might cause some print imperfection.

REFERENCES

The following references, the disclosures of which are incorporated by reference relate generally to fuser temperature control in a printing system:

U.S. Published Application No. 2004/0108309 to Dempsey, is directed to a method of reducing a fusing apparatus recovery time from a low energy-saver mode temperature back up to a high fusing temperature.

U.S. Published Application No. 2004/0060921 to Justice, is directed to a drum heater consisting of a plurality of vanes made preferably from mica material and having multiple separate heater wire channels controlled from an electrical cable is provided for heating the interior of a printer drum or fuser.

U.S. Published Application No. 2005/0103770 to Beomro Lee, is directed to a fusing system for use in an image forming apparatus that has a fusing temperature control unit having a controller which controls the surface temperature 'T' of the fusing roller.

However, the above references do not discuss the application of a variable control gain.

BRIEF DESCRIPTION

In accordance with one concept, a thermal system is disclosed. A thermal mass is characterized by a reference temperature. A thermal interrupter thermally interrupts the thermal mass upon contact. A look ahead processor examines the thermal interrupter ahead of anticipated contact with the thermal mass and determines an amount of anticipated thermal interruption. A PID gain calculator determines a PID gain for a control algorithm based on the determined amount of thermal interruption. A heater processor applies the control algorithm to a heater to heat the thermal mass to a prespecified start temperature which exceeds the reference temperature.

In accordance with another concept, a method is disclosed. Information about a thermal interrupter which is anticipated to make a contact with a thermal mass is received. The received information about the thermal interrupter is analyzed ahead of the anticipated contact with the thermal mass which is characterized by a reference temperature. An amount of anticipated thermal interruption is determined. A PID gain for a control algorithm is calculated based on the determined amount of thermal interruption. The control algorithm is applied to a heater.

DETAILED DESCRIPTION

Figure 1:
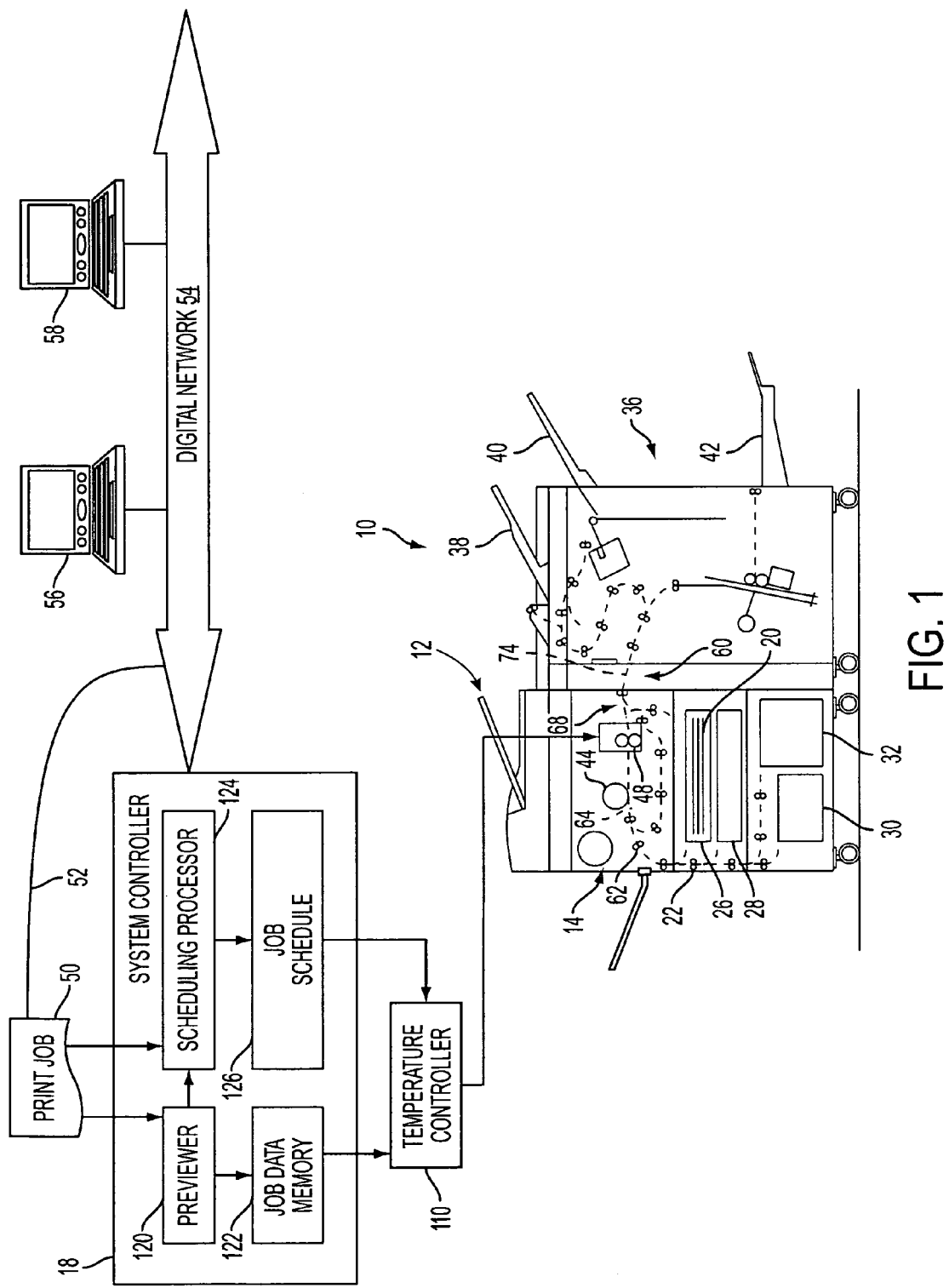
FIG. 1 is an illustration of a printing system.

With reference to FIG. 1, a printing system 10 includes an image input device 12 such as a scanner, a printer such as a printing or marking engine 14, and a system controller 18, all interconnected by links. The links can be wired or wireless links or other means capable of supplying electronic data to and/or from the connected elements. Exemplary links include telephone lines, computer cables, ISDN lines, and the like. The image input device 12 may include conversion electronics for converting the image-bearing documents to image signals or pixels or such function may be assumed by the marking engine 14.

The marking engine 14 is fed with a print media or sheet or sheets 20 from a respective print media feeding source 22 such as a paper feeder including one or more print media sources or paper trays 26, 28, 30, 32. Each of the print media sources 26, 28, 30, 32 can store sheets of the same type of print media, or can store different types of print media. For example, the print media sources 26, 28 may store the same type of large-size paper sheets, print media source 32 may store company letterhead paper, and the print media source 30 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 36 including one or more finishing output destinations 38, 40, 42 such as trays, stackers, pans, etc. The marking engine 14 includes an imaging component 44 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbelts, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

Print job or jobs 50 can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10. Alternatively, the print jobs 50 can be electronically delivered to the system controller 18 of the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system or network or highway 60 links the print media source 22, printer 14 and finisher 36. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 22 is delivered to the printer 14 by a pathway 64 which is common to the trays 26, 28, 30, 32. The print media is printed by the imaging component 44 and fused by the fuser 48. A pathway 68 from the printer 14 merges into a pathway 74 which conveys the printed media to the finisher 36.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

Figure 2:
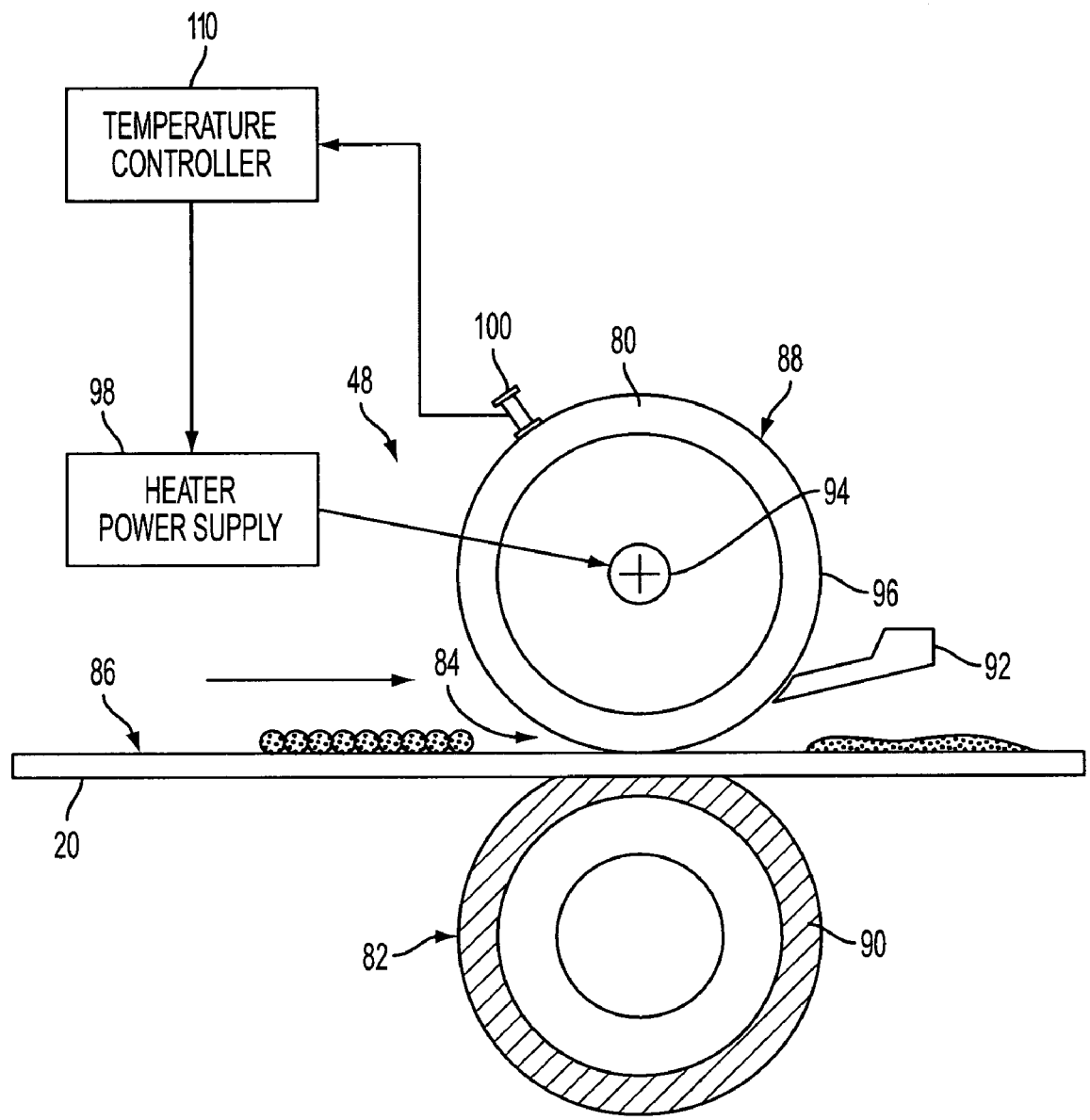
FIG. 2 is an illustration of a portion of the printing system.
Figure 3:
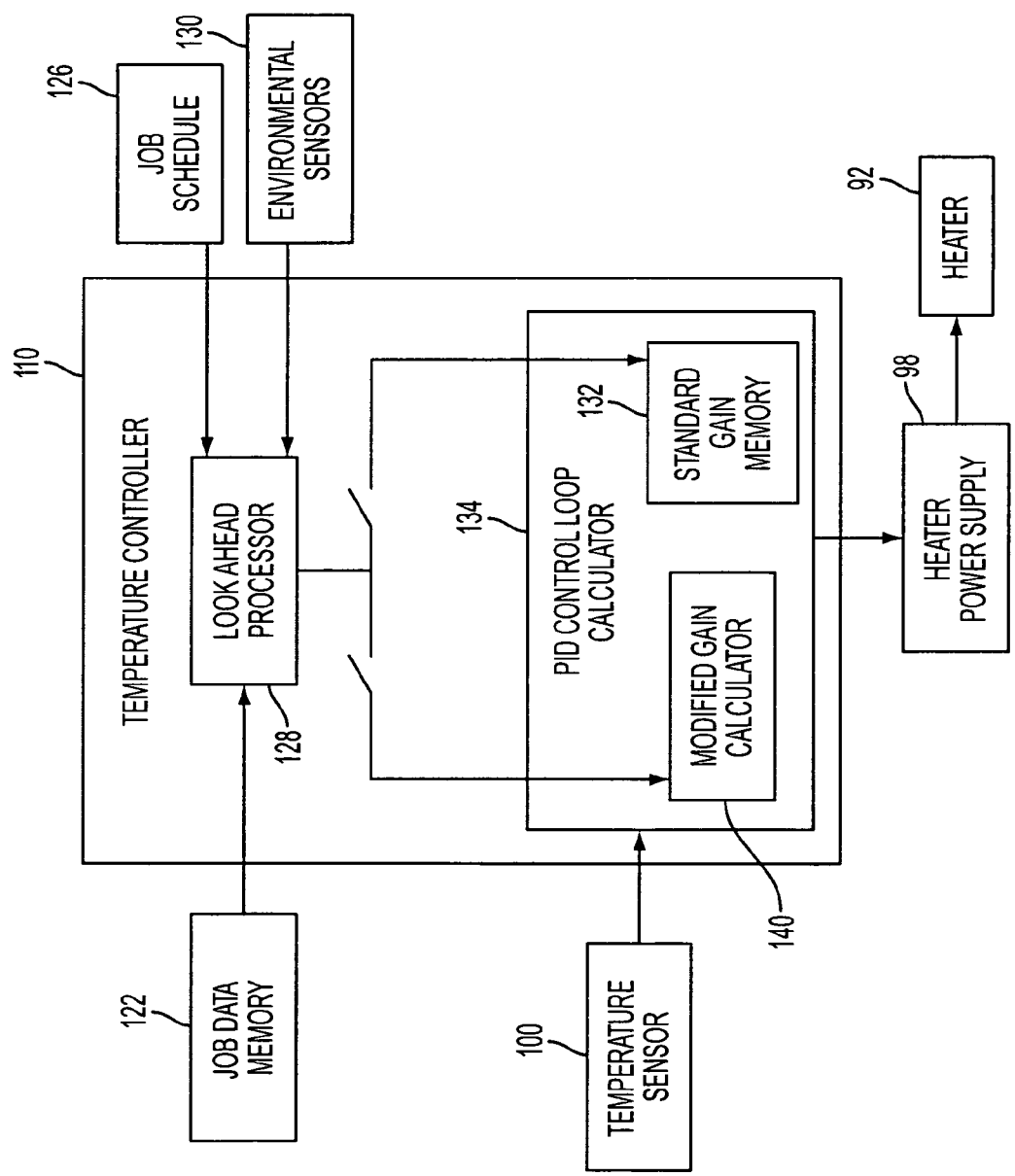
FIG. 3 is an illustration of another portion of the printing system.
Figure 4:
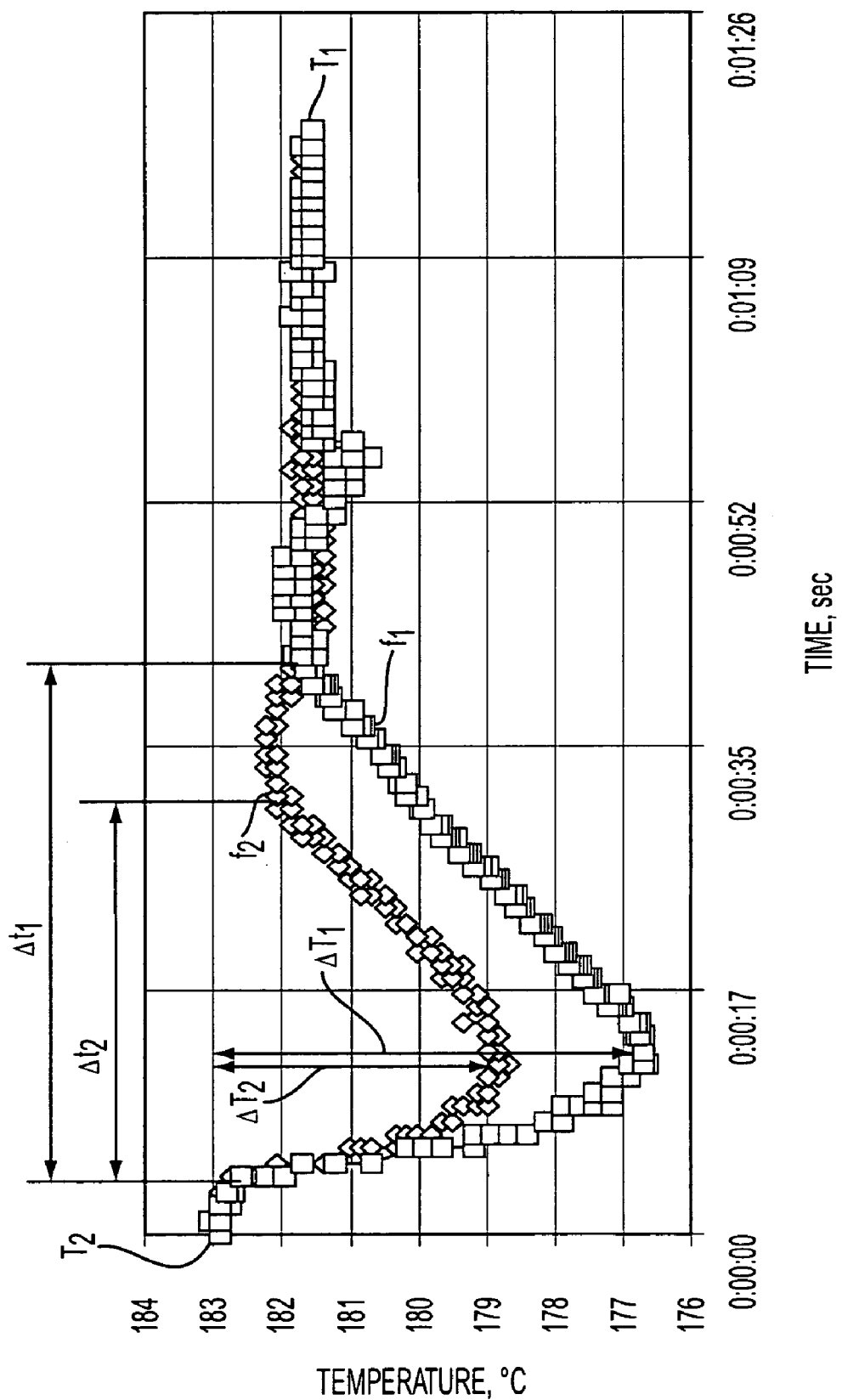
FIG. 4 is graphical illustrations of a temperature change versus time change.

With reference to FIGS. 2, 3 and 4, the exemplary fuser 48 includes a heated thermal mass or fuser roll 80 and a pressure roll 82, which are spaced by a nip 84, to melt a toner image into the media with heat and pressure. The process of fusing generally results in an attachment of an applied toner image to the print media substrate by at least partial melting of an imaging material. The fuser roll 80 faces the image side 86 of the sheet 20 and may have one or more elastomeric coatings 88. The pressure roll 82 may have one or more elastomeric coatings 90. A stripping assist 92 is located downstream of the nip to assist in separating the print media and fused toner from the fuser roll 80.

One or more heating sources such as lamps or heaters 94 are located about the fuser roll 80 for heating a fuser roll surface 96. For example, the heater 94 is axially located about a center of the fuser roll 80. The heater 94 may be controlled, for example, by varying the power supplied to the heater 94 via a heater power supply 98. More specifically, a temperature sensor 100, such as a thermistor, is positioned about the fuser roll surface 96 to detect the temperature of the fusing roll surface 96 and provide an input to a temperature controller or heater processor 110 which controls the heater power supply 98 to maintain the desired temperature of the fuser roll surface 96. The temperature controller 110 applies one of a standard fuser temperature control algorithms which are known in the art. Generally, in a print stand-by stage, in which the printer 14 awaits for the print command, the fuser roll surface 96 temperature is maintained at a prespecified first or stand-by temperature, such as, for example, 165°. In a print stage, in which the print command is received by the printer 14, the fuser roll surface 96 is heated to a second or reference or fusing temperature T1, which is a higher temperature than the first temperature, and is approximately equal to 180° in consideration of the heat loss at the time of fusing operation. The fusing temperature T1 is generally maintained at or substantially close to the reference temperature during the print stage. The temperature controller 110 modifies a standard gain of the standard temperature control algorithm to control the temperature of the fuser roll surface 96 with a better precision. More specifically, the temperature controller 110 applies the fuser temperature control algorithm with a large modified gain to faster heat the fuser roll surface 96 from the stand-by temperature to a higher third or start temperature T2, which is greater than the fusing temperature T1, in anticipation of a contact with a thermal interrupter such as cold print media 20 to prevent a substantial temperature drop. Near the end of the print job, the temperature controller 110 applies the temperature control algorithm with a small modified gain to faster and without overshoot cool down the thermal mass or the fuser roll 80 to a temperature which is lower than the fusing temperature T1, such as the stand-by temperature.

With reference again to FIG. 1, a previewer 120 previews each sheet of each incoming print job 50 which is scanned or otherwise delivered to the printing system 10. By a use of algorithms known in the art, the previewer 120 identifies traits or descriptions or job data of each sheet of each incoming print job and stores the job data in a job data memory 122. In one embodiment, the identified description is placed into a header associated with each previewed sheet. The job traits correspond to the descriptions of the desired output products. Examples of job traits are media type, media size, media weight, media surface coating, media roughness, black pages, process color pages, custom color pages, header/footer/logo pages, magnetic ink character recognition pages (MICR), high area coverage pages, low area coverage pages, duplex option, binding option, and folding option. The marking engine 14 may be capable of generating more than one type of print modality or the marking engine 14 may be, for example, black only, process color, or custom color marking device. Process color printers generally employ four inks or toners, magenta, cyan, and yellow, and optionally black. Different colors are achieved by superimposing images of the primary colors. Area coverages can be determined for each primary color image. Custom color printers are fed with a premixed ink which provides a specific color, generally with a higher color rendering accuracy than can be achieved with a process color printer. MICR printing applies a magnetic strip or other detectable portion to the page, for example, as a security feature for bank notes. A scheduling processor 124 determines a print schedule for each print job 50 which is stored in a job schedule memory 126.

With reference again to FIG. 3, a look ahead processor 128 determines whether a standard gain for the standard PID control algorithm needs to be adjusted. More specifically, the look ahead processor 128 continually monitors the information about the job schedule, job data, environmental conditions, such as, for example, the ambient temperature and humidity, from environmental sensors 130, and estimates an amount of thermal interruption or a value $\Delta T$ of a temperature drop which is going to be caused by the incoming print job, e.g. the cold thermal interrupter.

For example, some print jobs can be substantial thermal interrupters while other print jobs might be only slight thermal interrupters. Example of a substantial thermal interrupter is a large print job which requires a simplex printing on a heavyweight paper which is to be printed in a cold environment. Example of the slight thermal interrupter is a small print job, including only several pages, which is to be printed in a warm environment. In one embodiment, the look ahead processor 128 classifies the print jobs into categories such as, for example, substantial thermal interrupter, standard thermal interrupter, and slight thermal interrupter. In one embodiment, the look ahead processor 128 compares the estimated temperature drop value $\Delta T$, by which the temperature of the fuser roll surface 96 would drop upon contact with the thermal interrupter, to first and second threshold values $T_{H1}$ and $T_{H2}$ and determines whether the incoming print job 50 is one of the substantial, standard and slight thermal interrupter.

If the temperature drop value $\Delta T$ does not exceed the first threshold $T_{H1}$ and exceeds the second threshold $T_{H2}$ the look ahead processor 128 selects a standard PID gain which is stored in a standard PID gain memory 132 and used by a PID control loop calculator 134 in the calculation of the PID control loop which is applied to the heater power supply 98. If the temperature drop value $\Delta T$ exceeds the first threshold $T_{H1}$, the incoming print job 50 is a substantial thermal interrupter. The look ahead processor 128 switches calculation of the PID gain to a modified gain calculator 140 which calculates a modified PID gain which is larger than the standard PID gain. If the temperature drop value $\Delta T$ is less than the second threshold value $T_{H2}$, the incoming print job 50 is a slight thermal interrupter. In one embodiment, the look ahead processor 128 switches calculation of the PID gain to the modified gain calculator 140 which calculates a modified PID gain which is smaller than the standard PID gain.

More specifically, for the substantial thermal interrupter, the modified gain calculator 140 calculates a modified PID gain or an initial heat-up or elevated gain based on the information provided by the look ahead processor 128. For a substantial thermal interrupter, the PID gain is larger than for the standard or slight thermal interrupters. The PID control loop calculator 134 uses the larger PID gain in the PID loop calculation which is applied to the heater 92 ahead of time, for example, one minute before the print job 50 is scheduled to begin. By the end of the print job, the look ahead processor 128 determines whether another print job is coming and to what category of the thermal interrupter the new job belongs. If no print job is coming or the print job is a slight thermal interrupter, the modified gain calculator 140 calculates a cool down PID gain which is substantially smaller than the initial large gain and applies the small PID gain to the heater 92. If the look ahead processor 128 determines that the next incoming print job is the substantial thermal interrupter, the modified gain calculator 140 calculates a corresponding PID gain which, for example, might be larger or smaller than the PID gain calculated for the previous print job. The newly calculated PID gain is applied to the heater 92. In this manner, by continually monitoring the incoming print jobs and environmental conditions, the PID control gain is recalculated and adjusted during the execution of the print jobs to maintain the fuser roll surface 96 temperature within tight tolerances which results in a high quality output printing.

With continuing reference to FIG. 3 and reference again to FIG. 4, a graph of the thermal mass temperature versus time is shown. A fist graph $f_1$ uses a standard PID gain. A second graph $f_2$ uses a modified PID gain or elevated gain of a greater value than the standard PID gain. As discussed above, the thermal mass such as the fuser roll surface 96 is preheated to the start temperature T2. Upon contact with the thermal interrupter such as the print media 20, the thermal mass 96 experiences a drop in the start temperature T2 which is characterized by the temperature drop value ΔT. As shown in FIG. 4, a first temperature drop value $\Delta T_1$, which corresponds to the first graph $f_1$ and the standard PID gain, is greater than a second temperature drop value $\Delta T_2$, which corresponds to the second graph $f_2$ and the modified PID gain. The thermal mass 96 faster recovers from the temperature drop to the fusing temperature T1 when the modified PID gain is used, e.g. a second recovery time $\Delta t_2$ is shorter than a first recovery time $\Delta t_1$. The thermal delay effect, e.g. a time gap for heat energy to travel from the heater 94 to the thermal mass, is substantially minimized.

In this manner, the look ahead scheme can be added to most stand alone temperature controllers to calculate a specific control loop and schedule the execution of the control loop ahead of the thermal interruption to reduce fuser droop and overshoot. Near the end of the job, a smaller cool down gain is executed to prevent unwanted temperature overshoot. The technique is cost effective and could be developed entirely on the embedded software on a standard 8 bit microcontroller running at 16 MHz, with the additional top level interface development.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A thermal system comprising:
    a thermal mass which is characterized by a reference temperature;
    a thermal interrupter which thermally interrupts the thermal mass upon contact and is characterized by reducing the reference temperature upon contact with the thermal mass;
    a previewer which previews the thermal interrupter and identifies at least one trait of the thermal interrupter;
    a look ahead processor which examines the identified trait of the thermal interrupter ahead of anticipated contact with the thermal mass and determines an anticipated reduction of the reference temperature;
    a PID gain calculator which determines a PID gain for a control algorithm based on the determined anticipated reduction of the reference temperature; and
    a heater processor which applies the control algorithm to a heater to heat the thermal mass to a prespecified start temperature so that the reference temperature does not substantially drop when the thermal interrupter contacts the thermal mass.

2. The system as set forth in claim 1, wherein, based on the determined anticipated reduction of the reference temperature, the PID gain calculator calculates one of:
    a standard PID gain;
    an elevated PID gain; and
    a reduced PID gain.

3. The system as set forth in claim 1, wherein the PID gain calculator calculates a first PID gain based on the determined anticipated reduction of the reference temperature and wherein the heater processor applies the first PID gain to the heater to heat the thermal mass to a startup temperature, which is higher than the reference temperature, within a first predetermined time period to prevent the thermal mass from substantial deviation from the reference temperature upon the contact with the thermal interrupter.

4. The system as set forth in claim 3, wherein the heater controller applies the first PID gain to the heater prior to the thermal interrupter contact with the thermal mass.

5. The system as set forth in claim 3, wherein the look ahead processor continually monitors the traits of the thermal interrupter being identified by the previewer before the thermal interrupter contacts the thermal mass and wherein the PID gain calculator calculates a second PID gain based on the monitored identified traits which second PID gain is smaller than the first PID gain.

6. The system as set forth in claim 5, wherein the heater processor applies the second PID gain to the heater within a second predetermined time period which is near or at an end of the thermal interrupter contact with the thermal mass to cool down the thermal mass to a prespecified cool down temperature which is lower than the reference temperature.

7. The system as set forth in claim 1, wherein the thermal mass includes at least a fusing roller of a printer.

8. The system as set forth in claim 7, wherein the printer is a xerographic printer.

9. The system as set forth in claim 1, wherein the thermal interrupter includes at least a print job.

10. The system of claim 1, wherein the look ahead processor classifies the thermal interrupter into a light, medium and heavy thermal interrupter based on the identified trait, and the PID gain calculator determines one of elevated, reference and reduced PID gain for classified respective heavy, medium and light thermal interrupter.

11. The system of claim 10, further including:
    predefined default PID gains for the classified light, medium and heavy thermal interrupters.

12. The system of claim 9, wherein the identified trait includes at least one of:
    type of print media;
    environmental conditions; and
    a size of the print job.

13. A method comprising:
    receiving information about a thermal interrupter which is anticipated to make a contact with a thermal mass;
    previewing the thermal interrupter ahead of the anticipated contact;
    identifying traits of the previewed thermal interrupter;
    analyzing the identified traits of the thermal interrupter ahead of the anticipated contact with the thermal mass which is characterized by a reference temperature;
    based on the analysis, ahead of the anticipated contact with the thermal mass determining an anticipated reduction in the reference temperature at the time the thermal interrupter contacts the thermal mass;

calculating a PID gain for a control algorithm based on the determined anticipated reduction in the reference temperature;

applying the control algorithm to a heater; and heating the thermal mass to a prespecified start temperature which exceeds the reference temperature so that the reference temperature does not substantially drop upon contact of the thermal interrupter with the thermal mass.

14. The method as set forth in claim 13, wherein the step of calculating the PID gain includes:

based on the determined anticipated reduction in the reference temperature one of calculating a standard PID gain, an elevated PID gain, and a reduced PID gain.

15. The method as set forth in claim 13, wherein the step of calculating the PID gain includes:

calculating a first PID gain based on the determined anticipated reduction in the reference temperature;

applying the first PID gain to the heater;

prior to the thermal interrupter contact with the thermal mass, heating the thermal mass within a first predetermined time period to the prespecified start temperature which exceeds the reference temperature to prevent the substantial deviation of the thermal mass from the reference temperature upon the contact with the thermal interrupter;

continually monitoring the identified traits of the thermal interrupter before the thermal interrupter contacts the thermal mass;

calculating a second PID gain based on the monitored identified traits of the thermal interrupter, which second PID gain is smaller than the first PID gain;

applying the second PID gain to the heater within a second predetermined time period which is near or at an end of the thermal interrupter contact with the thermal mass; and cooling down the thermal mass to a prespecified cool down temperature which is lower than the reference temperature.

16. The method as set forth in claim 13, wherein the thermal mass includes at least a fusing roller of a printer.

17. A xerographic printer for use with the method of claim 13.

18. A method comprising:

previewing a thermal interrupter which is anticipated to make a contact with a thermal mass and substantially reduce a first prespecified temperature of the thermal mass;

identifying traits of the previewed thermal interrupter;

prior to the thermal interruption, analyzing the identified traits of the thermal interrupter;

based on the analysis, determining a reduction of the first prespecified temperature upon anticipated thermal interruption;

determining an elevated PID gain for a control algorithm based on the determined reduction of the first prespecified temperature;

applying the control algorithm with the elevated PID gain to a heater;

heating the thermal mass with the heater to a second temperature which is higher than the first temperature ahead of the anticipated thermal interruption, such that the temperature of the thermal mass does not substantially deviate from the first temperature upon the contact with the thermal interrupter;

continually monitoring the traits of the thermal interrupter prior to the thermal interrupter contact with the thermal mass;

based on the monitored information, recalculating the PID gain which is one of equal to and smaller than the elevated PID gain;

applying the control algorithm with the recalculated PID gain to the heater;

identifying an anticipated end of the thermal interruption;

calculating a cool down PID gain which is smaller than the recalculated PID gain;

applying the control algorithm with the cool down PID gain to the heater at or near the identified end of the contact of the thermal interrupter with the thermal mass; and cooling down the thermal mass to a third temperature which is lower than the first temperature.

19. The method of claim 18, wherein the thermal interrupter includes a print job and the traits include characteristics of the print job.

20. The method of claim 18, wherein the thermal mass includes a fuser of a printer.

* * * * *